US010080322B2

(12) United States Patent
Redekop et al.

(10) Patent No.: US 10,080,322 B2
(45) Date of Patent: Sep. 25, 2018

(54) FLEXIBLE CULTIVATOR IMPLEMENT

(71) Applicant: J A Redekop Holdings Ltd., Winkler (CA)

(72) Inventors: Johan Redekop, Winkler (CA); Terrance Friggstad, Winkler (CA)

(73) Assignee: J A Redekop Holdings Ltd.

( * ) Notice: Subject to any disclaimer, the term of this patent is extended or adjusted under 35 U.S.C. 154(b) by 61 days.

(21) Appl. No.: 15/474,277

(22) Filed: Mar. 30, 2017

(65) Prior Publication Data
US 2017/0354083 A1    Dec. 14, 2017

Related U.S. Application Data

(60) Provisional application No. 62/350,019, filed on Jun. 14, 2016.

(51) Int. Cl.
*A01B 63/22* (2006.01)
*A01B 73/04* (2006.01)

(52) U.S. Cl.
CPC ............ *A01B 73/044* (2013.01); *A01B 63/22* (2013.01)

(58) Field of Classification Search
CPC ....... A01B 73/04; A01B 73/02; A01B 73/044; A01B 63/22; A01B 63/002; A01B 63/008
USPC .................. 172/311, 395, 400, 669
See application file for complete search history.

(56) References Cited

U.S. PATENT DOCUMENTS

| 4,535,848 | A  | * | 8/1985  | Pfenninger | A01B 73/04 172/311 |
| 6,684,962 | B1 | * | 2/2004  | Lewallen   | A01B 63/22 111/57  |
| 9,974,224 | B2 | * | 5/2018  | Sudbrink   | A01B 73/046        |
| 2015/0129259 | A1 | * | 5/2015 | Sudbrink | A01B 63/22 172/407 |
| 2015/0129264 | A1 | * | 5/2015 | Sudbrink | A01B 73/046 172/668 |
| 2017/0079189 | A1 | * | 3/2017 | Steinlage | A01B 61/044 |
| 2017/0251587 | A1 | * | 9/2017 | Sporrer   | A01B 5/04   |
| 2017/0318730 | A1 | * | 11/2017 | Sudbrink | A01B 63/22  |

FOREIGN PATENT DOCUMENTS

| CA | 2419757 A1 | * | 4/2004 | ............ A01B 73/04 |
| WO | WO-2004004439 A1 | * | 1/2004 | ............ A01B 63/22 |

* cited by examiner

*Primary Examiner* — John Weiss
(74) *Attorney, Agent, or Firm* — Ryan W. Dupuis; Ade & Company Inc.; Kyle R. Satterthwaite

(57) ABSTRACT

A flexible cultivator implement frame includes a center section and two wing sections. The center section has a main portion and two side portions supported at opposing sides of the main portion for pivotal movement relative to the main portion about respective flexing axes. The flexing axes of the center section are sloped to extend forwardly and laterally outwardly relative to the forward working direction. Each wing section has an inner portion and an outer portion pivotally coupled to the inner portion about a respective flexing axis. The flexing axes of the wing sections are sloped to extend forwardly and laterally inwardly relative to the forward working direction so as to be oriented transversely to the flexing axes of the center section of the frame such that the flexible frame follows ground contours while minimizing undesirable stresses in and twisting of various pivots and frame members.

16 Claims, 12 Drawing Sheets

FLEXIBLE CULTIVATOR IMPLEMENT

This application claims the benefit under 35 U.S.C. 119(e) of U.S. provisional application Ser. No. 62/350,019, filed Jun. 14, 2016.

FIELD OF THE INVENTION

The present invention relates to an agricultural cultivator implement including a center frame section and two wing frame sections pivotally connected at laterally opposing sides of the center frame section for floating movement about respective wing axes, and more particularly the present invention relates to a winged cultivator implement in which each of the frame sections is formed of at least two frame portions which are pivotal relative to one another about a diagonal flexing axis oriented transversely to the wing axes.

BACKGROUND

A common structure of an agricultural cultivator implement is to provide a centre frame section with two wing frame sections pivotally connected at laterally opposing sides of the centre frame section for floating movement about respective wing axes oriented generally in the forward working direction of the implement across the ground. The wings can be both pivoted upwardly to reduce the width of the implement for transport in a transport position, or remain floating about the wing axes while extending laterally outwardly in a working position.

To further improve the ability of the frame to flex over varying ground contours, it is further known to separate each frame section into two or more frame portions having some ability to flex relative to one another; however, the additional flexing can provide undesirable stress on the pivotal connections of the frame as well as undesirable twisting of various frame members of the frame.

SUMMARY OF THE INVENTION

According to one aspect of the invention there is provided a cultivator implement for towing connection to a towing vehicle for movement in a forward working direction across a soil covered ground, the implement comprising:

a frame including a center section and two wing sections extending laterally outwardly from opposing sides of the center section;

the center section of the frame comprising a main portion and two side portions supported at opposing sides of the main portion for pivotal movement relative to the main portion about respective flexing axes of the center section; and the two wing sections being pivotally connected to the side portions of the center section respectively for pivotal movement relative to the center section about respective wing axes oriented generally in the forward working direction;

a hitch supported on the center section for connection to the towing vehicle; and a plurality of tool mounts for supporting ground working tools on the frame for cultivating the ground as the implement is towed in the forward working direction;

wherein the flexing axes are sloped to extend forwardly and laterally outwardly relative to the forward working direction.

The configuration of the flexible cultivator implement frame as described closely follows ground contours while minimizing undesirable stresses at various pivotal connections of the frame and/or undesirable twisting of various frame members of the frame.

Preferably, the flexing axes of the center section of the frame intersect one another adjacent to a rear end of the frame.

Preferably a transfer link is pivotally coupled at opposing ends to the two side portions of the center section of the frame respectively for pivotal movement about respective transfer link axes. The transfer link axes preferably intersect one another at an intersection of the flexing axes of the center section of the frame adjacent to a rear end of the frame.

The hitch may comprise two hitch arms which are pivotally coupled at respective rear ends of the hitch arms on the two side portions of the center section and which are connected at respective front ends for connection to the towing vehicle. Preferably each hitch arm is pivotally coupled to the respective side portion of the center section of the frame adjacent the respective flexing axis. Each hitch arm is preferably pivotally coupled to the respective side portion of the center section about a multi-axis pivot connection.

The implement may further comprise two center wheel sets pivotally coupled on the two side portions of the center section respectively for supporting the center section for rolling movement along the ground and a hydraulic linkage operatively connected between each center wheel set and the respective side portion of the frame for controlling a height of the wheel set relative to the respective side portion of the frame, the hydraulic linkages of the center wheel sets being hydraulically linked to one another. A mechanical linkage is preferably resiliently coupled between the two center wheel sets.

The implement may be further configured such that each side portion of the center section of the frame is mounted on a center wheel set and wherein each wing section of the frame is mounted a wing wheel set in which each center and wing wheel set comprises: i) a walking beam supporting a pair of rear wheels thereon for pivotal movement about a walking axis of the walking beam; ii) a rear height adjustment linkage controlling height of the walking axis relative to the frame; iii) a front caster wheel forwardly of the walking beam; iv) a front height adjustment linkage controlling height of the front caster wheel relative to the frame; and v) a four bar linkage operatively connected between the front and rear height adjustment linkages for adjusting height of the walking axis and the front caster wheel together.

Each wing section may further comprise an inner portion pivotally coupled to the center section and an outer portion pivotally coupled to the inner portion about a respective flexing axis of the wing section to extend laterally outward relative to the inner portion, wherein the flexing axes of the wing sections are sloped to extend forwardly and laterally inwardly relative to the forward working direction so as to be oriented transversely to the flexing axes of the center section of the frame.

When the wing sections are pivotal relative to the center section about the respective wing axes from a working position extending laterally outwardly from the opposing sides of the center section to a transport position extending generally upwardly from the opposing sides of the center section, the implement may further comprise two hydraulic wing actuators operatively connected between the center section and the wing sections respectively for displacing the wing sections between the working position and the transport position in which the hydraulic wing actuators are pivotally coupled to the center section on the two side portions respectively. Each hydraulic wing actuator may be operatively connected to the respective wing section by a floating connection allowing some floating movement of the wing section relative to the wing actuator as the wing section pivots relative to the center section about the respective wing axis.

When the wing sections are pivotal relative to the center section about the respective wing axes from a working position extending laterally outwardly from the opposing sides of the center section to a transport position extending generally upwardly from the opposing sides of the center section, the implement may further comprise two hydraulic wing actuators operatively connected between the center section and the wing sections respectively for displacing the wing sections between the working position and the transport position in which each hydraulic wing actuator is operatively connected to the respective wing section by i) a crank member pivotally mounted on the wing section at an inner side of the wing section upon which the hydraulic wing actuator is pivotally connected, and ii) a bracing link extending laterally outward in the working position from an inner end pivotally connected to the crank member and an outer end slidably connected to the wing section at a location spaced laterally outward from the crank member.

According to another important independent aspect of the present invention, the hitch comprises two hitch arms which are pivotally coupled at respective rear ends of the hitch arms on the two side portions of the center section and which are connected at respective front ends for connection to the towing vehicle.

According to another important independent aspect of the present invention, the implement further comprises:

two center wheel sets pivotally coupled on the two side portions of the center section respectively for supporting the center section for rolling movement along the ground;

a hydraulic linkage operatively connected between each center wheel set and the respective side portion of the frame for controlling a height of the wheel set relative to the respective side portion of the frame, the hydraulic linkages of the center wheel sets being hydraulically linked to one another; and a mechanical linkage resiliently coupled between the two center wheel sets.

According to another important independent aspect of the present invention, each side portion of the center section of the frame is mounted on a center wheel set and each wing section of the frame is mounted a wing wheel set, each center and wing wheel set comprising:

a walking beam supporting a pair of rear wheels thereon for pivotal movement about a walking axis of the walking beam;

a rear height adjustment linkage controlling height of the walking axis relative to the frame;

a front caster wheel forwardly of the walking beam;

a front height adjustment linkage controlling height of the front caster wheel relative to the frame; and a four bar linkage operatively connected between the front and rear height adjustment linkages for adjusting height of the walking axis and the front caster wheel together.

According to another important independent aspect of the present invention, the wing sections are pivotal relative to the center section about the respective wing axes from a working position extending laterally outwardly from the opposing sides of the center section to a transport position extending generally upwardly from the opposing sides of the center section, the implement further comprising two hydraulic wing actuators operatively connected between the center section and the wing sections respectively for displacing the wing sections between the working position and the transport position, the hydraulic wing actuators being pivotally coupled to the center section on the two side portions respectively.

According to another important independent aspect of the present invention, the wing sections are pivotal relative to the center section about the respective wing axes from a working position extending laterally outwardly from the opposing sides of the center section to a transport position extending generally upwardly from the opposing sides of the center section, the implement further comprising two hydraulic wing actuators operatively connected between the center section and the wing sections respectively for displacing the wing sections between the working position and the transport position, each hydraulic wing actuator being operatively connected to the respective wing section by i) a crank member pivotally mounted on the wing section at an inner side of the wing section upon which the hydraulic wing actuator is pivotally connected, and ii) a bracing link extending laterally outward in the working position from an inner end pivotally connected to the crank member and an outer end slidably connected to the wing section at a location spaced laterally outward from the crank member.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
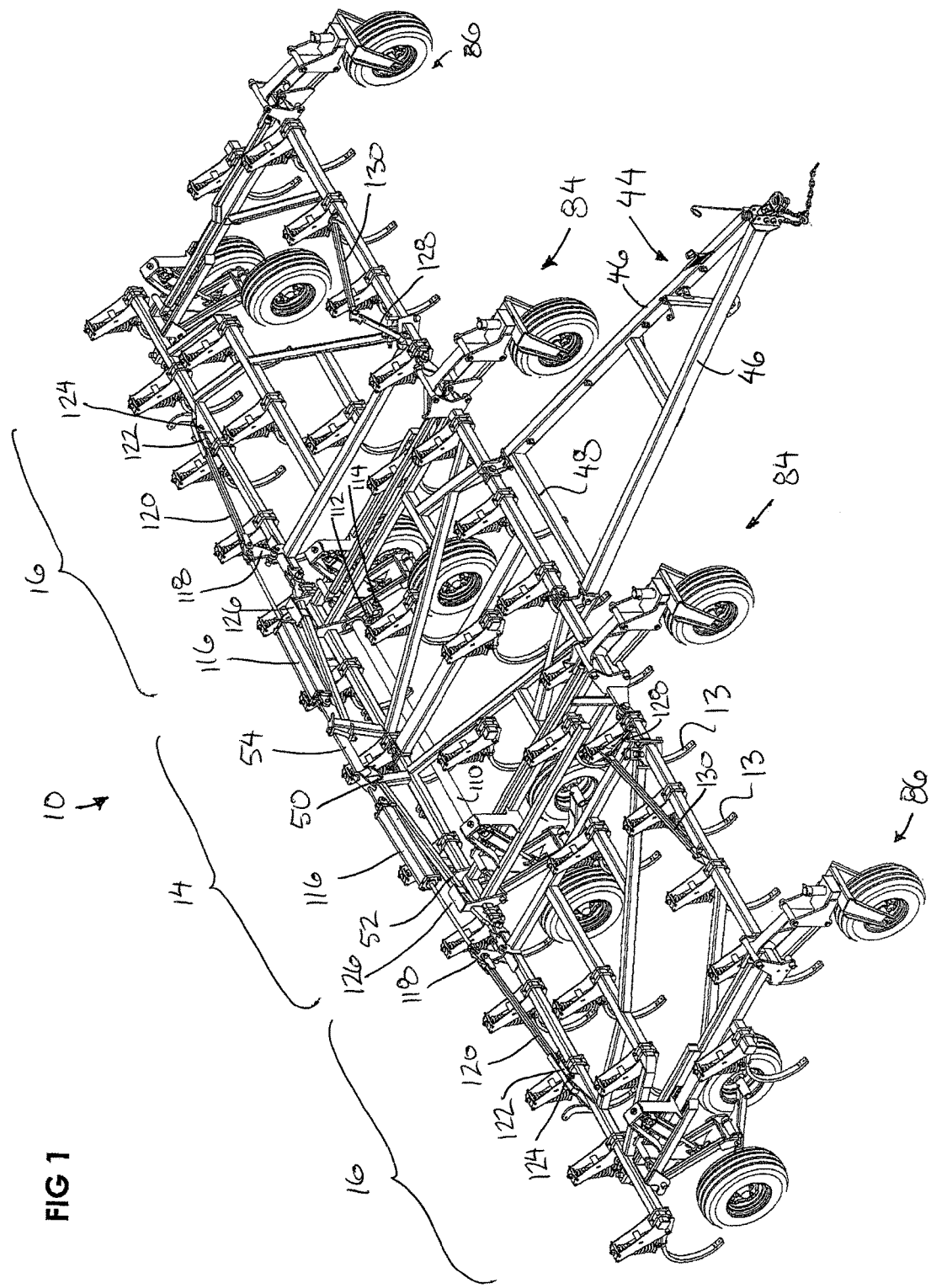
FIG. 1 is a perspective view of the cultivator implement according to the present invention.
Figure 2:
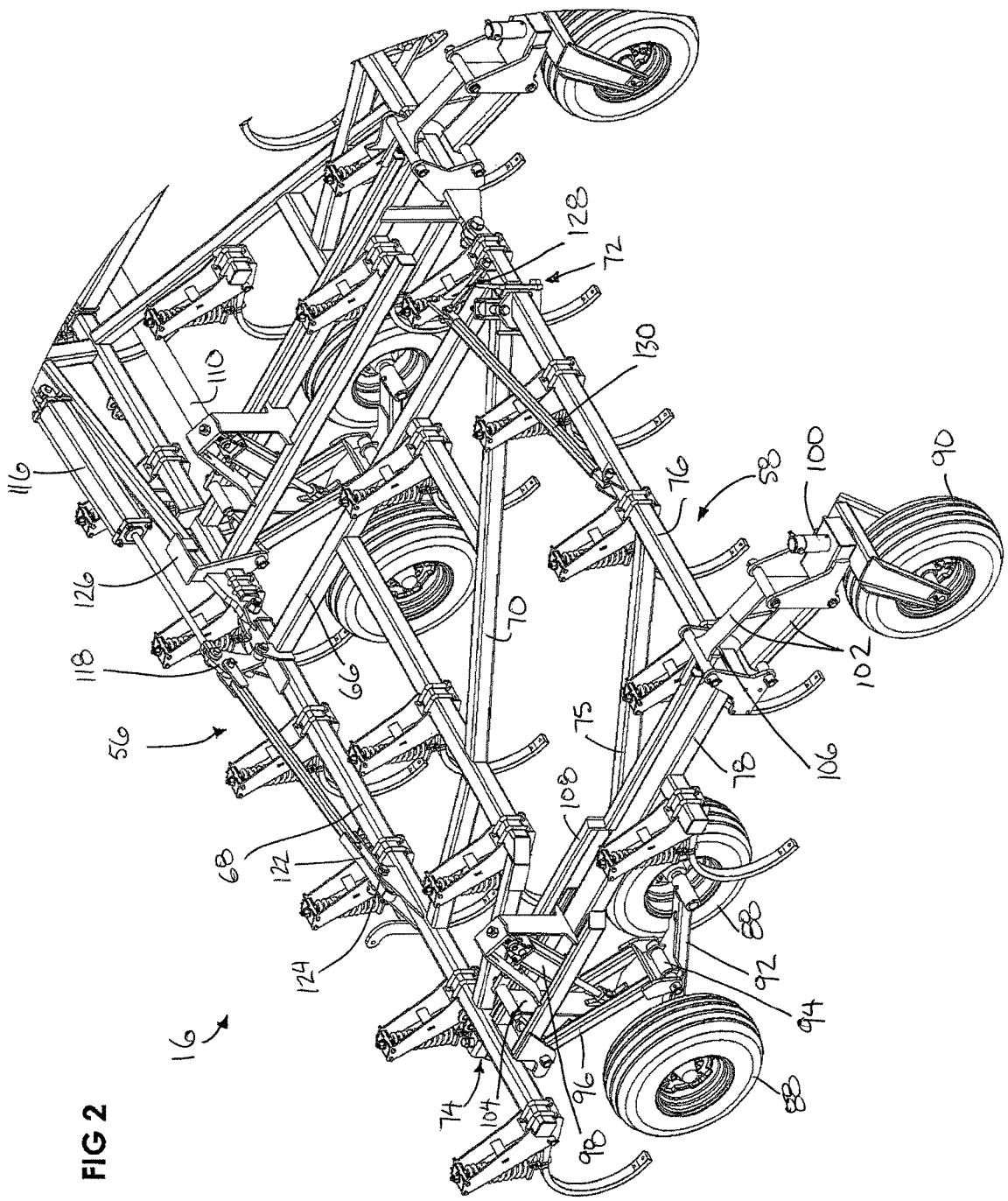
FIG. 2 is an enlarged perspective view of one of the wing sections of the implement according to FIG. 1.
Figure 3:
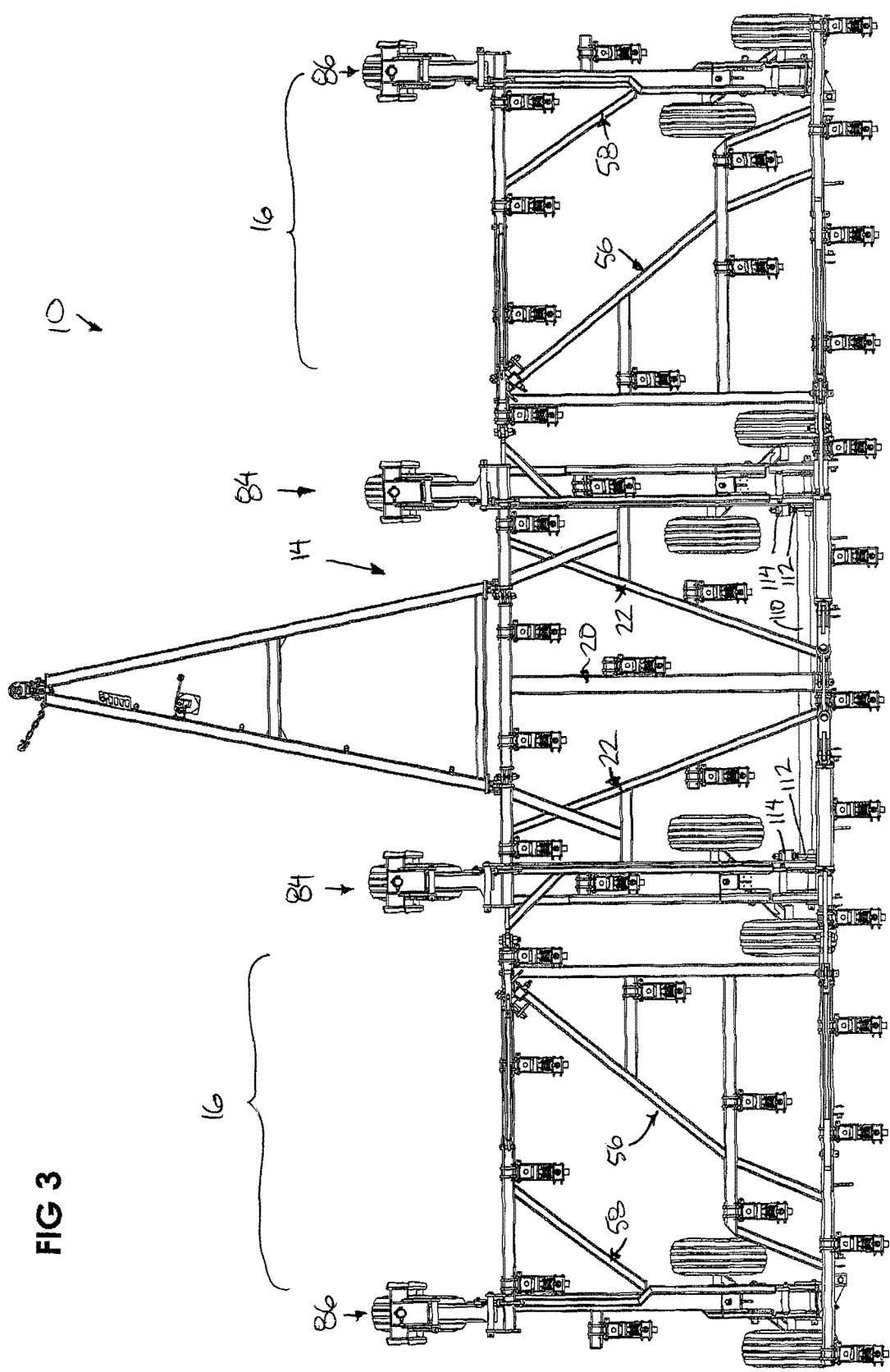
FIG. 3 is a plan view of the implement.
Figure 4:
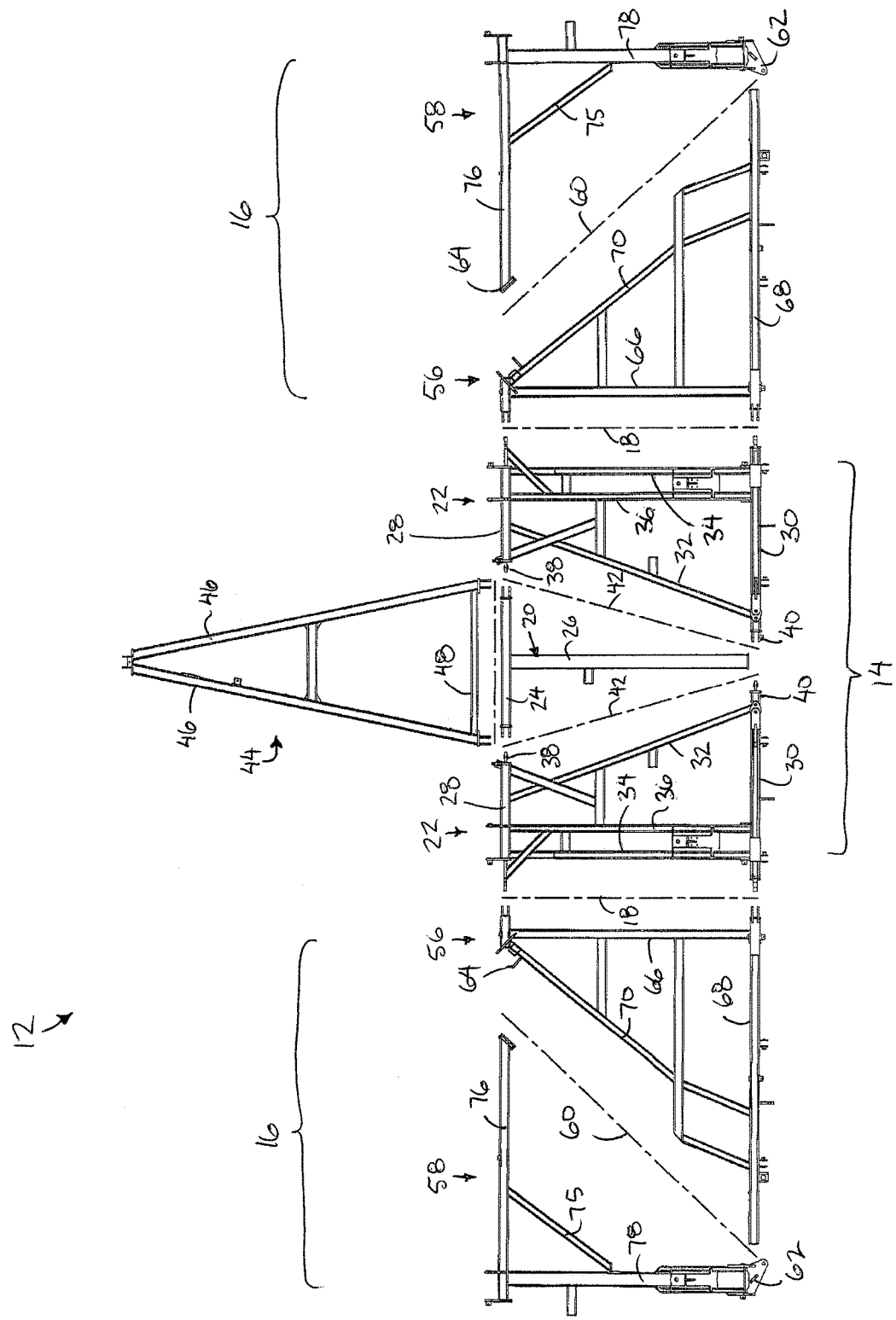
FIG. 4 is a schematic plan view of the implement showing various floating and flexing axes of the frame.
Figure 5:
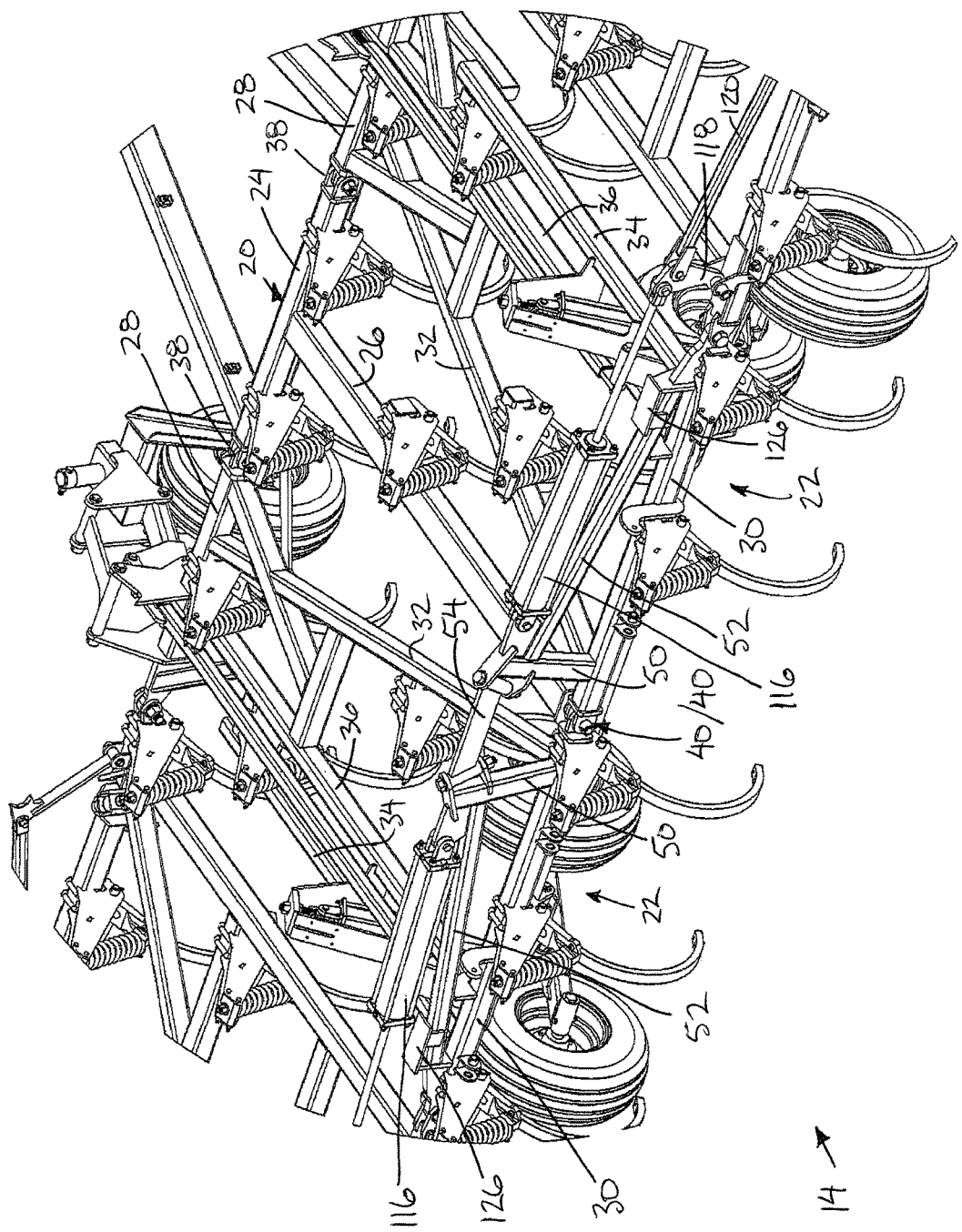
FIG. 5 is a perspective view of a rear side of the centre frame section.
Figure 6:
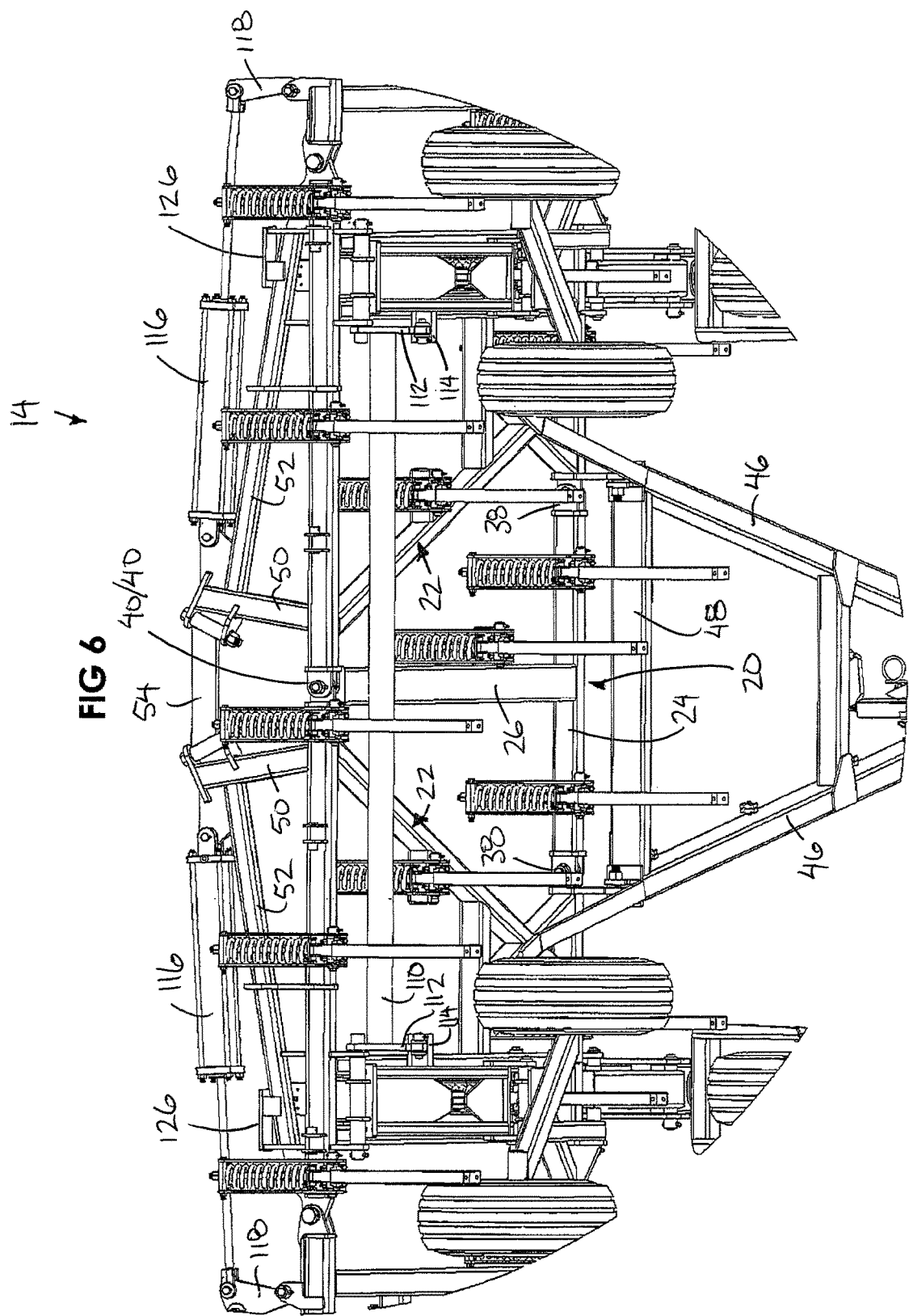
FIG. 6 is a perspective view of a bottom and rear side of the centre frame section.
Figure 7:
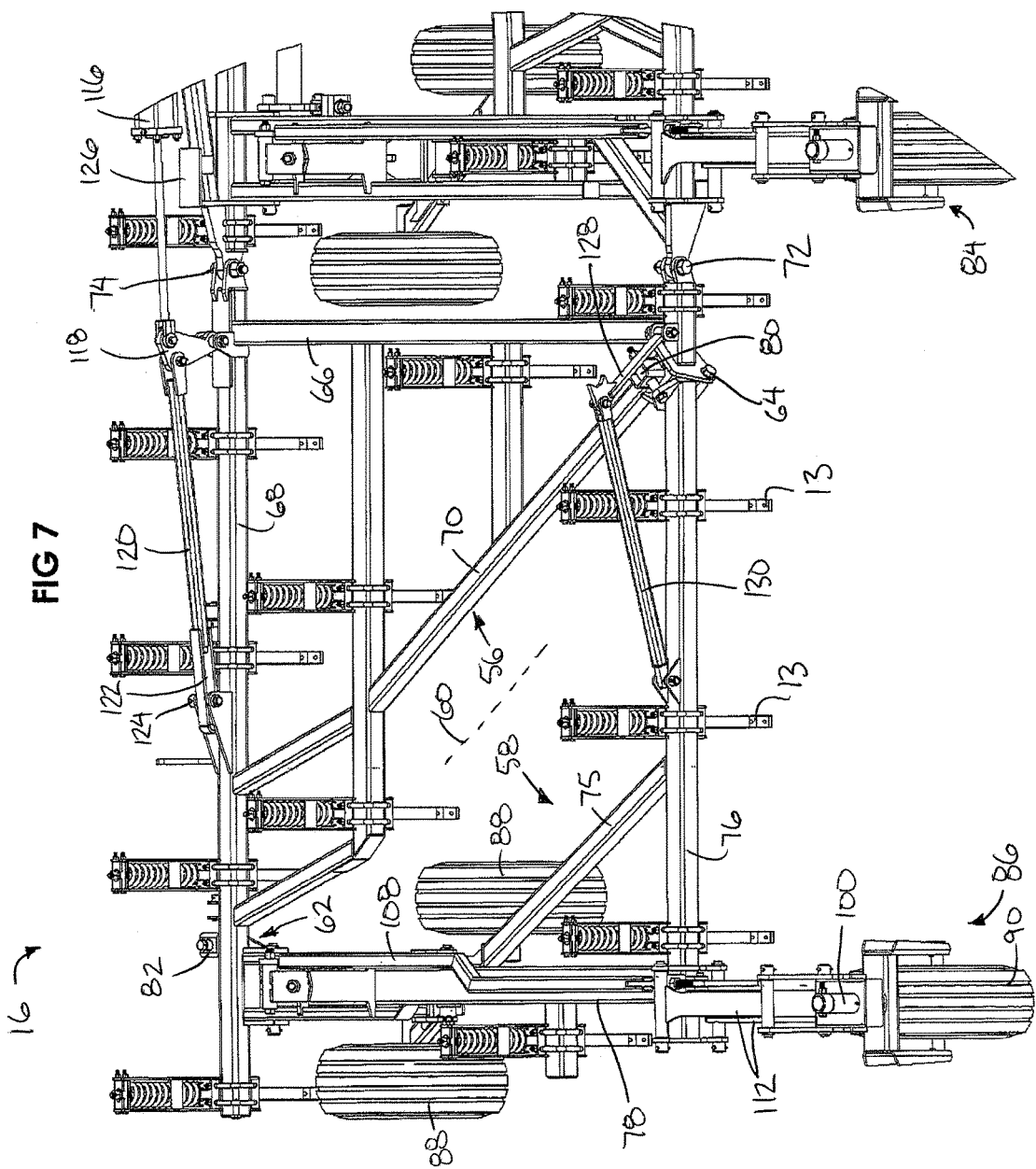
FIG. 7 is a front and top perspective view of one of the wing frame sections.
Figure 8:
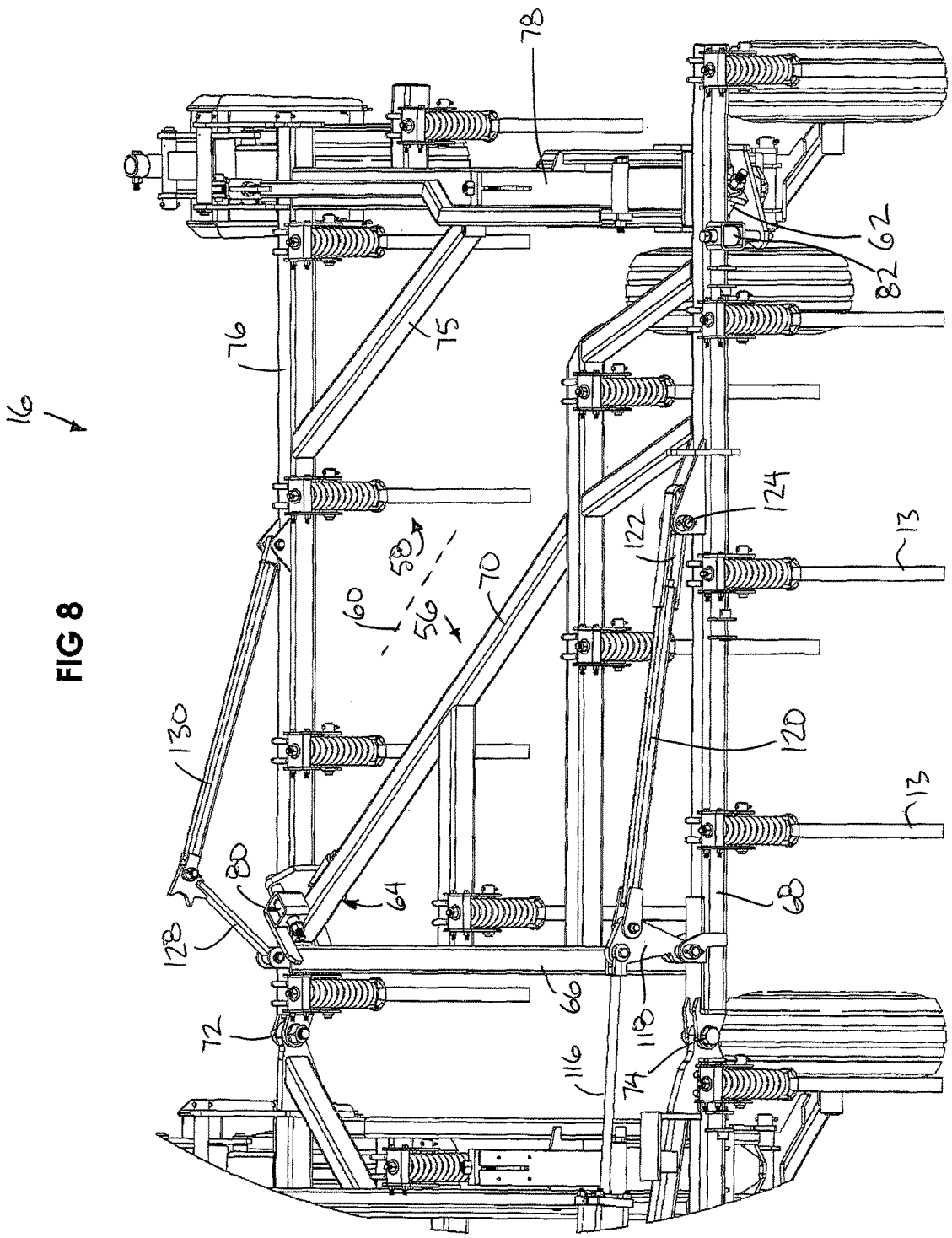
FIG. 8 is a rear and top perspective view of one of the wing frame sections.

Referring to the accompanying figures there is illustrated a flexible winged cultivator implement generally indicated by reference numeral 10. The implement is particularly suited for cultivating ground when connected by a towing connection to a tractor for movement across the ground with a tractor in a forward working direction.

The implement 10 generally includes a flexible frame 12 and a plurality of tool mounts 13 for supporting respective ground working tools on the frame, for example shovel openers, for cultivating the ground as the implement is towed in the forward working direction.

The flexible frame 12 is comprised of a centre section 14 and two wing sections 16 which extend laterally outwardly from opposing sides of the centre section in a normal working position. Each wing section 16 is pivotally supported at a respective side of the centre section for relative pivotal movement about a wing axis 18 oriented generally in the forward working direction. The wing sections are thus pivotal relative to the centre section between a working position extending laterally outward from opposing sides of the centre frame section, and a transport position in which the wing sections extend generally upwardly from the respective sides of the centre section.

The centre frame section 14 generally includes a main portion 20 and two side portions 22 which are pivotally supported at laterally opposing sides of the main portion 20. The main portion 20 comprises a front beam 24 extending laterally across the front end of the main portion of the centre frame section. A centre beam 26 extends longitudinally rearward from a central location on the front beam in fixed relation thereto to span the full length of the frame between opposing front and rear ends thereof.

Each side portion 22 comprises a front beam 28 extending laterally across the front end of the side portion, a rear beam 30 extending laterally across a rear end of the side portion, an inner beam 32 connected between the front and rear beams at the inner side, and an outer beam 34 connected between the front and rear beams at an outer side of the side portion. An intermediate beam 36 also extends between the front and rear beams at an intermediate location between the inner and outer beams.

The inner ends of the front beams 28 are pivotally connected to respective opposing ends of the front beam 24 of the main portion 20 by respective front pivots 38. The inner ends of the rear beams 30 are pivotally connected at a common rear pivot 40 at the rear end of the centre beam 26. Each of the front and rear pivots 38 and 40 comprise multiaxis ball joint components so as to define two diagonal flexing axes 42 defining the pivotal movement of the two side portions 22 relative to the main portion 20 respectively. Each flexing axis 42 extends between the rear pivot 40 and a respective one of the front pivots 38 such that the two flexing axes of the centre frame section intersect one another at the rear end of the centre frame section. The two flexing axes are thus sloped relative to the forward working direction such that the two axes each extend forwardly and laterally outwardly so as to diverge from one another in the forward direction.

A hitch 44 is provided for connection to the towing tractor. The hitch includes two hitch arms 46 which are joined in laterally spaced apart relationship at the rear ends thereof by a rear crossbar 48. The hitch arms extend forwardly and towards one another in fixed relation to one another so as to be also joined at the front ends thereof, and at an intermediate location by an intermediate crossbar. The rear ends of the two hitch arms 46 are pivotally supported on respective ones of the front beams 28 of the two side portions 22 respectively. Each rear hitch arm 46 is connected by a pivot connection at the inner end of the front beam 28 so as to be in close proximity to the front pivots 38 respectively. The hitch arms are primarily coupled for pivotal movement about a common horizontal axis extending through the rear ends of the two hitch arms, however each pivot connection at the rear ends of the hitch arms to the respective side portions 22 of the centre frame section includes a ball joint element to allow some multiaxis relative pivotal movement to accommodate for twisting of the hitch arms relative to the centre frame section about a forwardly oriented axis.

Each side portion 22 of the centre frame section further includes a rear brace portion comprised of an inner brace member 50 and an outer brace member 52. The inner brace members extend upwardly from the inner ends of the rear beams 30 respectively at a slight diverging orientation relative to one another. Each outer brace 52 connects to the top end of the inner brace member 50 to extend generally laterally outwardly at a downward slope across most of the width of the side portion 22 for connection to the outer end of the rear beam 30 at the outer end of the brace member 52. The rear brace members 50 and 52 are mounted in fixed relation to the respective side portion 22 of the centre frame section.

A transfer link 54 extends generally laterally between the top ends of the two inner brace members of the two side portions 22 of the centre frame respectively at a location spaced above the planes of the remaining frame members of the two side portions 22 respectively. The transfer link 54 is pivotally coupled at opposing ends to the two inner brace members 50 respectively. Each pivotal connection defines a transfer link axis which is sloped downwardly and inwardly such that the two transfer link axes intersect one another at the intersection of the floating axes 42 at the rear of the centre frame section 14. The two transfer link axes are oriented to lie in a common plane which lies generally perpendicularly to the forward working direction in a normal working position on horizontal ground.

Each wing frame section 16 includes an inner portion 56 pivotally coupled to the centre frame section and an outer portion 58 extending laterally outward from the inner portion 56. The inner portion and the outer portion of each wing frame section are pivotally coupled for limited pivotal movement relative to one another about a respective flexing axis 60 which is oriented at a slope to extend forwardly and laterally inwardly between a rear pivot 62 at the rear end of the wing frame section and a front pivot 64 at the front end of the wing frame section.

The inner portion 56 of each wing frame section includes an inner beam 66 extending longitudinally between front and rear ends of the wing frame section at the inner side thereof and a rear beam 68 extending laterally along the rear end of the inner portion 56 across the full width thereof. An outer beam 70 extends diagonally generally between the front end of the inner beam 66 and the rear beam 68 towards the outer end thereof such that the inner portion 56 of the wing frame section is generally triangular in shape. Additional cross bracing is provided for structural support and to provide support for various ground working elements supported on the frame.

A front wing pivot 72 pivotally couples the front end of the inner beam 66 of the wing frame section to the front end of the outer beam 34 of the respective side portion of the centre frame section. Similarly, a rear wing pivot 74 pivotally couples the rear end of the inner beam 66 of the wing frame section to the rear end of the outer beam of the respective side portion of the centre frame section. The respective wing axes 18 for thus defined as extending longitudinally through the front and rear wing pivots 72 and 74.

The outer portion 58 of each wing frame section includes a front beam 76 extending laterally across the front end of the wing frame section, and an outer beam 78 extending between front and rear ends of the wing frame section at the outer side thereof. An additional crossbar 75 extends diagonally between the front beam and the outer beam at intermediate locations thereon for structural support such that the outer portion 58 of each wing frame section is also generally triangular in shape. The inner end of the front beam 76 is pivotally connected to the inner portion of the frame by the front pivot 64. The rear end of the outer beam 78 is pivotally connected to the inner portion of the frame by the rear pivot 62.

Figure 9:
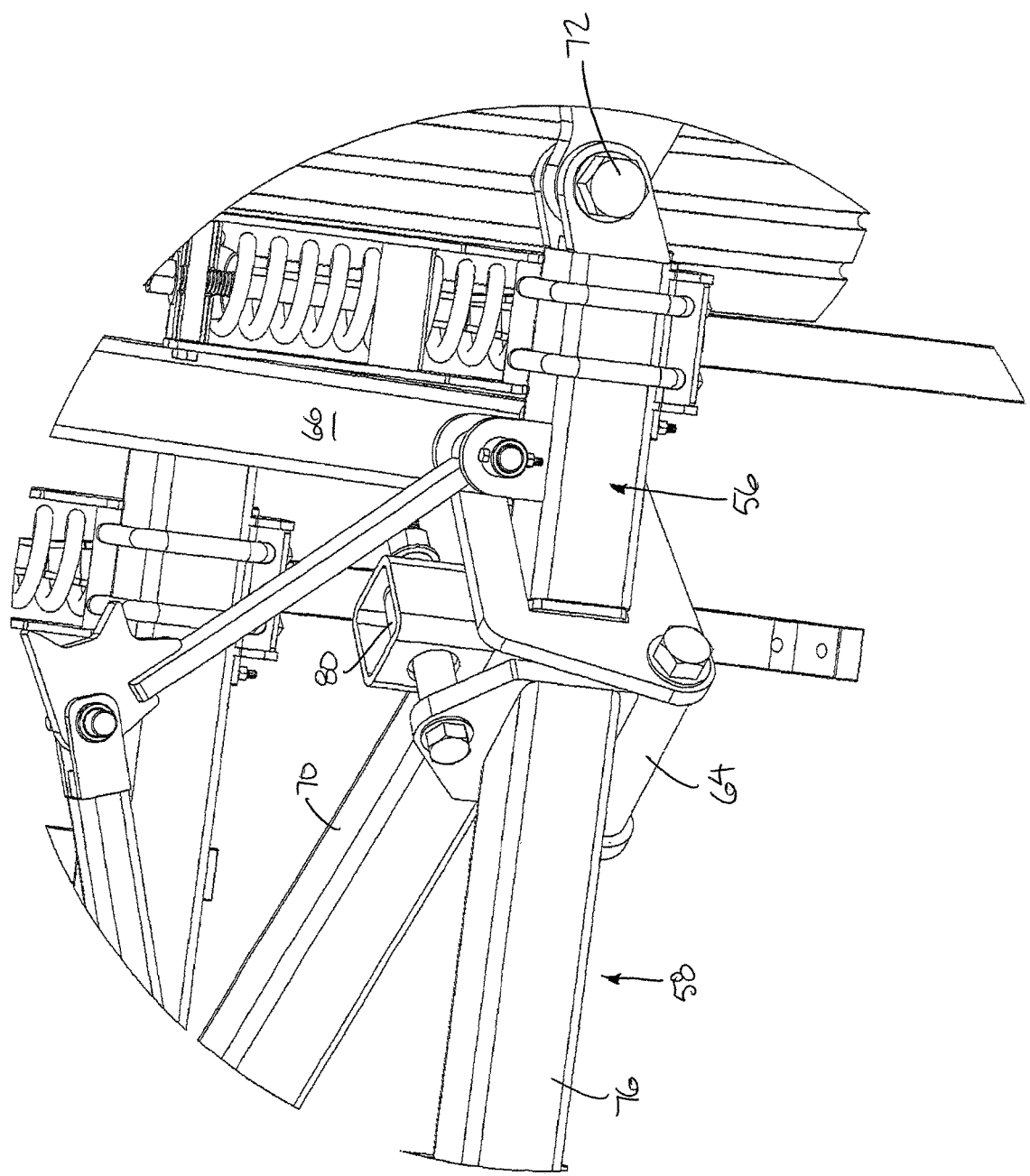
FIG. 9 is a front and top perspective view of a forward pivot of the flexing axis of one of the wing frame sections.

As best shown in FIG. 9, the front pivot 64 includes a pivot shaft supported by support plates on the inner portion of the wing frame section for rotatably supporting a pivot tube thereon in alignment with the flexing axis 60 to which the corresponding portion of the outer portion of the wing frame section is attached for pivotal movement with the pivot tube relative to the pivot shaft. A front resilient damper member 80 is coupled between corresponding mounting portions on the inner and outer portions of the wing frame section respectively at a location spaced radially outward from the flexing axis 60 in proximity to the front pivot 64 to limit the relative pivotal movement within a small range of angles.

Figure 10:
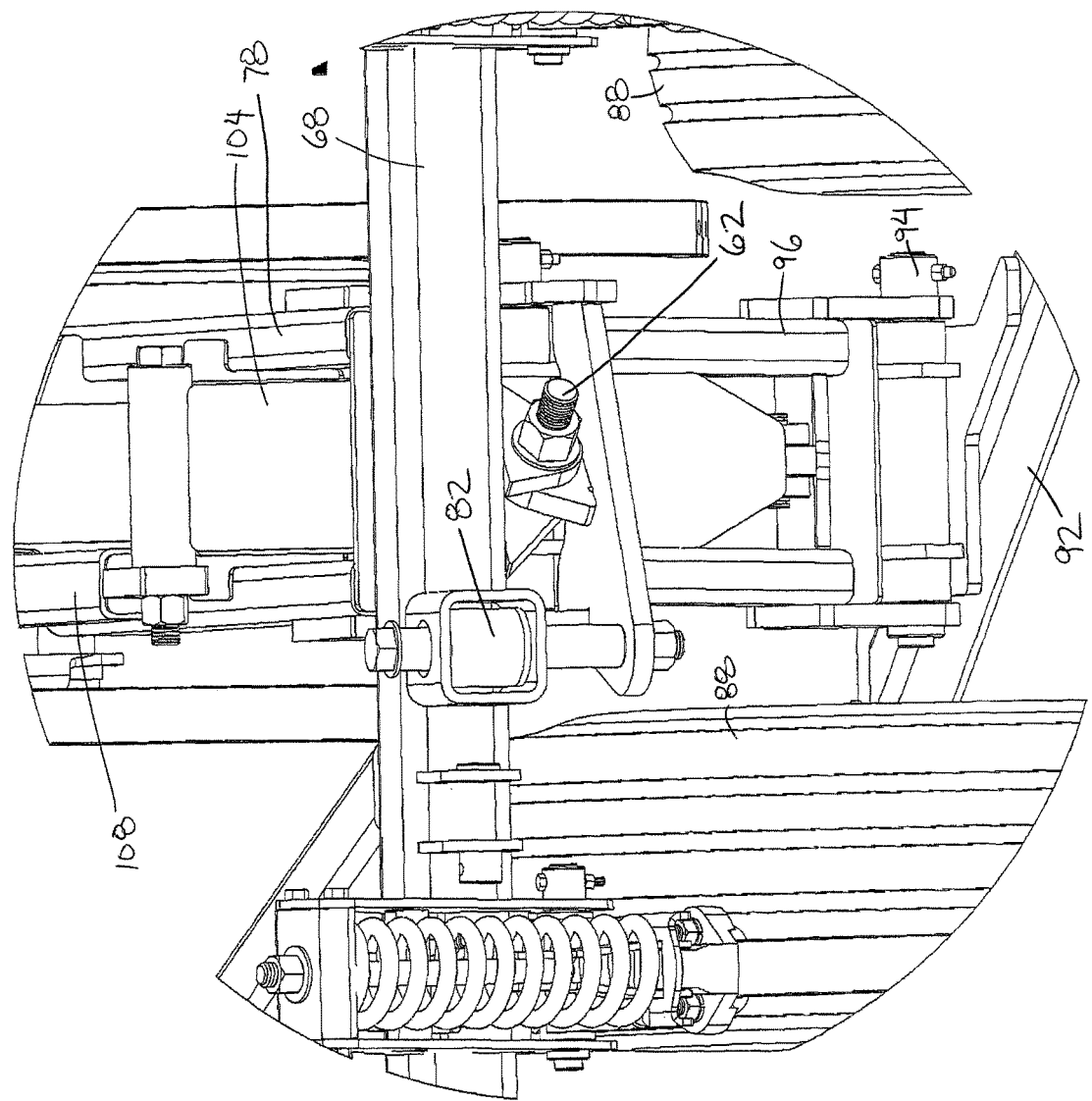
FIG. 10 is a top and rear perspective view of a rearward pivot of the flexing axis of one of the wing frame sections.
Figure 11:
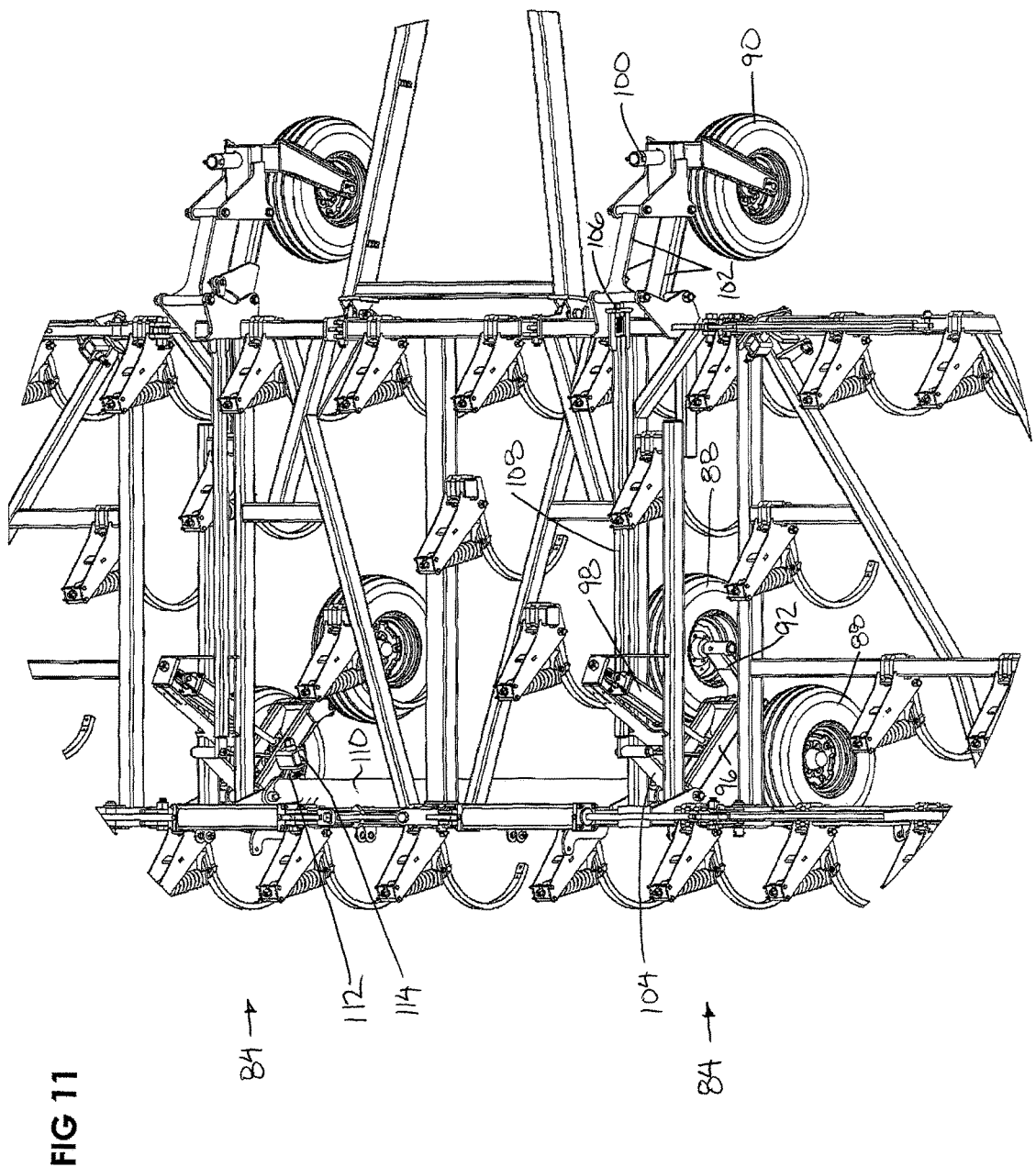
FIG. 11 is a side and top perspective view of one of the centre wheel sets of the centre frame section.
Figure 12:
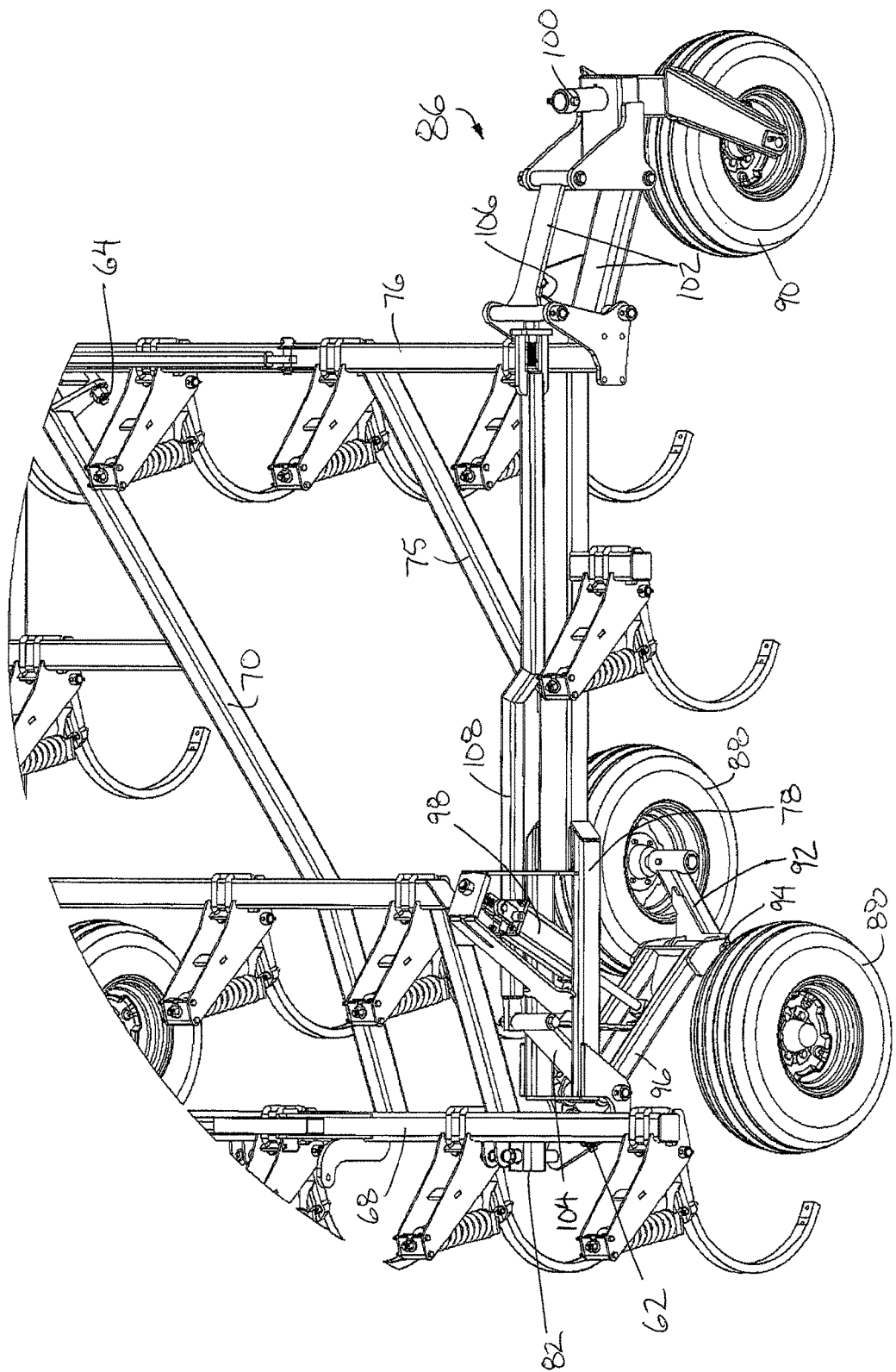
FIG. 12 is a side and top perspective view of one of the wing wheel sets of the wing frame sections.

As best shown in FIG. 10, the rear pivot 62 comprises a pivot shaft supported by support plates below the outer end of the rear beam of the inner portion of the wing frame section. A corresponding pivot tube is rotatably supported on the shaft and is coupled to suitable support plates to the rear end of the outer beam of the outer portion of the wing frame section. The pivot shaft defines the axis of pivotal movement and is aligned with the floating axis 60 between the inner and outer portions of the wing frame section. A rear resilient damper member 82 is coupled between the corresponding mounting portions on the inner and outer portions of the wing frame section at a location spaced radially outward from the flexing axis 60 in proximity to the rear pivot 62 to aid in limiting the relative pivotal movement between the inner and outer portions of the wing frame section within a small range of angles.

A plurality of wheel sets are provided for supporting the frame sections for rolling movement across the ground. The wheel sets include two centre wheel sets 84 supported on the outer beams of the two side portions of the centre frame section 14 respectively, and two wing wheel sets 86 supported on the outer beams of the outer portions of the two wing frame sections 16 respectively.

Each of the centre and wing wheel sets 84 and 86 generally comprises two rear wheels 88 in proximity to the rear end of the frame and one front wheel 90 in proximity to the front end of the frame. The two rear wheels 88 are rotatably supported at opposing ends of a walking beam 92 which is oriented generally in the forward working direction for pivotal movement about a lateral walking axle 64 defining a respective axis centrally located between the two rear wheels 88. A rear support arm 96 is pivotally connected at the rear end of the respective outer beam to extend generally downwardly and forwardly to a pivotal connection of the walking beam thereon at the forward end of the rear support arm. Pivotal movement of the rear support arm relative to the frame section enables the height of the walking axis 64 and thus the height of the two rear wheels 88 to be controlled relative to the frame. A hydraulic wheel actuator 98 is coupled between the corresponding portion of the frame section at a top end, and to a location on the rear support arm 96 spaced forwardly from the rear pivot thereof such that extension and retraction of the hydraulic wheel actuator 98 will raise and lower the walking axis 64 and the height of the rear wheels relative to the frame.

The front wheel 90 of each wheelset comprises a caster wheel supported on a castor mount 100 for relative pivotal movement about a vertical castering axis. Two parallel links 102 are coupled in parallel between the front end of the corresponding frame section and the castor mount 100 to extend generally and the forward working direction such that pivotal movement of the links 102 relative to the frame section allows the height of the castor mount and the front castor wheel rotatably supported thereon to be raised and lowered relative to the frame section.

Height of the rear wheels and the height of the associated front wheel within each wheel set can be adjusted together with one another by a suitable linkage connected therebetween. The linkage includes a rear crank member 104 coupled in fixed relation to the rear support arm 96 to extend radially from the rear pivot axis thereof in a generally upright orientation. A front crank member 106 is coupled to one of the parallel links 102 supporting the front wheel to similarly extend radially from the pivot axis of the link relative to the frame section. A parallel link member 108 is coupled between the rear crank member 104 and the front crank member 106 such that the height of the front wheel and the height of the walking axis between the rear wheels are adjusted together relative to the frame by the actuation of the associated hydraulic wheel actuator 98.

The hydraulic wheel actuators 98 of the two centre frame sections are hydraulically connected with one another such that increased pressure on one of the actuators permits fluid to be transferred to the other actuator in a pressure balancing configuration. Accordingly, when one of the centre wheel sets passes over a raised ground elevation, upward pressure can divert hydraulic fluid to the opposing centre wheelset to raise one wheelset relative to the frame and lower the other wheelset relative to the frame as pressure is balanced.

The centre frame section further includes a mechanical linkage coupled between the two centre wheel sets 84 to limit the independent movement between the two centre wheel sets within a prescribed limited range of angles. The mechanical linkage includes a transverse tube 110 which extends laterally substantially the full width between the two centre wheel sets. The transverse tube 110 is pivotally supported at opposing ends onto the two side portions of the centre frame section coaxially with the pivotal connection of the rear ends of the rear support arms 96 of the centre wheel sets 84. A pair of crank members 112 are mounted in fixed relation to the transverse tube at laterally opposing ends thereof to extend generally forwardly at a downward slope in proximity to the rear support arms 96. A resilient damper 114 is coupled between each crank member 112 and the respective rear support arm 96 of the respective centre wheel set which allows some resilient deflection of each crank member relative to the respective rear support arm of the respective centre wheelset. In this arrangement, the overall flexing movement of the two side portions relative to the main portion and relative to one another within the centre frame section is limited to the range of angles prescribed by the resiliently connected mechanical linkage between the two centre wheel sets.

To control displacement of the wing sections relative to the centre frame section between working and transport positions, two hydraulic wing actuators 116 are provided. Each hydraulic wing actuator 116 includes an inner end which is pivotally coupled to the top end of an inner brace member 50 at the rear of an inner end of a corresponding one of the two side portions of the centre frame section. The wing actuators 116 extend generally laterally outward away from one another to respective outer ends operatively connected to the inner portions of the two wing frame sections respectively. More particularly each wing frame section pivotally supports a crank member 118 thereon for pivotal movement about an axis oriented generally in the forward working direction adjacent to the inner end of the wing frame section. In the working position, the outer end of the respective wing actuator 116 is pivotally supported relative to the crank member at a location spaced above the pivotal connection of the crank member to the wing frame section. A bracing link 120 is pivotally coupled at an inner end on the crank member at an intermediate location between the pivotal connection of the wing actuator and the pivotal connection to the frame respectively. The bracing link 120 extends generally laterally outward in the normal working position to an outer end including a longitudinal slot 122 formed therein which slidably receives a pin 124 therein which is fixed onto the rear beam of the inner portion of the wing frame section, towards the outer end thereof. The pin 124 is permitted two longitudinally slide within the slot in the longitudinal direction of the bracing link 120 to allow some floating movement between the wing actuator and the wing frame section as the wing frame section pivots relative to the centre frame section about the wing axis thereof.

In this arrangement, retracting the hydraulic wing actuators causes the crank members to be pivoted inwardly so that the pin 124 slides to one end of the slot and continued retraction of the wing actuator causes the wing to be pulled upwardly and inwardly from the working position to the transport position. The pivotal connection between the crank member 118 and the outer end of the wing actuator includes a rolling contact thereon which engages a corresponding support plate 126 on the top side of the centre frame section at the rear end in proximity to the outer side thereof as the wing frame section approaches the transport position.

To provide support to the front end of the wing frame section which extends upwardly at a slightly inward slope in the transport position, an additional front brace is provided. The front brace includes a first brace member 128 pivotally supported on the front end of the inner beam of the wing frame section to extend upwardly at a slight outward slope in the working position, and a second brace member 130 pivotally connected at the top end of the first brace member 128 to extend generally laterally outwardly at a downward slope in the working position for pivotal connection at an outer end to the front beam of the outer portion of the wing frame section at an intermediate location between the inner end outer ends thereof. The first brace member 128, the second brace member 130 and the front end of the wing frame section thus form a generally triangular shape. As the wing frame section is pivoted into the transport position, the junction of the first and second brace members abuts a corresponding supporting location on the front end of the respective side portion 22 of the centre frame section such that the inward slope of the wing frame section in the transport position leans on the first brace member to assist in supporting the wing frame section thereon.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A cultivator implement for towing connection to a towing vehicle for movement in a forward working direction across a soil covered ground, the implement comprising:

a frame including a center section and two wing sections extending laterally outwardly from opposing sides of the center section;
        the center section of the frame comprising a main portion and two side portions supported at opposing sides of the main portion for pivotal movement relative to the main portion about respective flexing axes of the center section; and
        the two wing sections being pivotally connected to the side portions of the center section respectively for pivotal movement relative to the center section about respective wing axes oriented generally in the forward working direction;
    a hitch supported on the center section for connection to the towing vehicle; and
    a plurality of tool mounts for supporting ground working tools on the frame for cultivating the ground as the implement is towed in the forward working direction;
    wherein the flexing axes are sloped to extend forwardly and laterally outwardly relative to the forward working direction.

2. The implement according to claim 1 the flexing axes of the center section of the frame intersect one another adjacent to a rear end of the frame.

3. The implement according to claim 1 further comprising a transfer link pivotally coupled at opposing ends to the two side portions of the center section of the frame respectively for pivotal movement about respective transfer link axes.

4. The implement according to claim 3 wherein the transfer link axes intersect one another at an intersection of the flexing axes of the center section of the frame adjacent to a rear end of the frame.

5. The implement according to claim 1 wherein the hitch comprises two hitch arms which are pivotally coupled at respective rear ends of the hitch arms on the two side portions of the center section and which are connected at respective front ends for connection to the towing vehicle.

6. The implement according to claim 5 wherein each hitch arm is pivotally coupled to the respective side portion of the center section of the frame adjacent the respective flexing axis.

7. The implement according to claim 5 wherein each hitch arm is pivotally coupled to the respective side portion of the center section about a multi-axis pivot connection.

8. The implement according to claim 1 further comprising two center wheel sets pivotally coupled on the two side portions of the center section respectively for supporting the center section for rolling movement along the ground and a hydraulic linkage operatively connected between each center wheel set and the respective side portion of the frame for controlling a height of the wheel set relative to the respective side portion of the frame, the hydraulic linkages of the center wheel sets being hydraulically linked to one another.

9. The implement according to claim 8 further comprising a mechanical linkage resiliently coupled between the two center wheel sets.

10. The implement according to claim 1 wherein each side portion of the center section of the frame is mounted on a center wheel set and wherein each wing section of the frame is mounted a wing wheel set, each center and wing wheel set comprising:

a walking beam supporting a pair of rear wheels thereon for pivotal movement about a walking axis of the walking beam;
    a rear height adjustment linkage controlling height of the walking axis relative to the frame;
    a front caster wheel forwardly of the walking beam;

a front height adjustment linkage controlling height of the front caster wheel relative to the frame; and a four bar linkage operatively connected between the front and rear height adjustment linkages for adjusting height of the walking axis and the front caster wheel together.

11. The implement according to claim 1 wherein each wing section comprises an inner portion pivotally coupled to the center section and an outer portion pivotally coupled to the inner portion about a respective flexing axis of the wing section to extend laterally outward relative to the inner portion, wherein the flexing axes of the wing sections are sloped to extend forwardly and laterally inwardly relative to the forward working direction so as to be oriented transversely to the flexing axes of the center section of the frame.

12. The implement according to claim 1 wherein the wing sections are pivotal relative to the center section about the respective wing axes from a working position extending laterally outwardly from the opposing sides of the center section to a transport position extending generally upwardly from the opposing sides of the center section, the implement further comprising two hydraulic wing actuators operatively connected between the center section and the wing sections respectively for displacing the wing sections between the working position and the transport position, the hydraulic wing actuators being pivotally coupled to the center section on the two side portions respectively.

13. The implement according to claim 12 wherein each hydraulic wing actuator is operatively connected to the respective wing section by a floating connection allowing some floating movement of the wing section relative to the wing actuator as the wing section pivots relative to the center section about the respective wing axis.

14. The implement according to claim 1 wherein the wing sections are pivotal relative to the center section about the respective wing axes from a working position extending laterally outwardly from the opposing sides of the center section to a transport position extending generally upwardly from the opposing sides of the center section, the implement further comprising two hydraulic wing actuators operatively connected between the center section and the wing sections respectively for displacing the wing sections between the working position and the transport position, each hydraulic wing actuator being operatively connected to the respective wing section by i) a crank member pivotally mounted on the wing section at an inner side of the wing section upon which the hydraulic wing actuator is pivotally connected, and ii) a bracing link extending laterally outward in the working position from an inner end pivotally connected to the crank member and an outer end slidably connected to the wing section at a location spaced laterally outward from the crank member.

15. A cultivator implement for towing connection to a towing vehicle for movement in a forward working direction across a soil covered ground, the implement comprising:

a frame including a center section and two wing sections extending laterally outwardly from opposing sides of the center section;

the center section of the frame comprising a main portion and two side portions supported at opposing sides of the main portion for pivotal movement relative to the main portion about respective flexing axes of the center section; and the two wing sections being pivotally connected to the side portions of the center section respectively for pivotal movement relative to the center section about respective wing axes oriented generally in the forward working direction;

a hitch supported on the center section for connection to the towing vehicle; and a plurality of tool mounts for supporting ground working tools on the frame for cultivating the ground as the implement is towed in the forward working direction;

two center wheel sets pivotally coupled on the two side portions of the center section respectively for supporting the center section for rolling movement along the ground;

a hydraulic linkage operatively connected between each center wheel set and the respective side portion of the frame for controlling a height of the wheel set relative to the respective side portion of the frame, the hydraulic linkages of the center wheel sets being hydraulically linked to one another; and a mechanical linkage resiliently coupled between the two center wheel sets.

16. A cultivator implement for towing connection to a towing vehicle for movement in a forward working direction across a soil covered ground, the implement comprising:

a frame including a center section and two wing sections extending laterally outwardly from opposing sides of the center section;

the center section of the frame comprising a main portion and two side portions supported at opposing sides of the main portion for pivotal movement relative to the main portion about respective flexing axes of the center section; and the two wing sections being pivotally connected to the side portions of the center section respectively for pivotal movement relative to the center section about respective wing axes oriented generally in the forward working direction;

a hitch supported on the center section for connection to the towing vehicle; and a plurality of tool mounts for supporting ground working tools on the frame for cultivating the ground as the implement is towed in the forward working direction;

wherein the wing sections are pivotal relative to the center section about the respective wing axes from a working position extending laterally outwardly from the opposing sides of the center section to a transport position extending generally upwardly from the opposing sides of the center section, the implement further comprising two hydraulic wing actuators operatively connected between the center section and the wing sections respectively for displacing the wing sections between the working position and the transport position, each hydraulic wing actuator being operatively connected to the respective wing section by i) a crank member pivotally mounted on the wing section at an inner side of the wing section upon which the hydraulic wing actuator is pivotally connected, and ii) a bracing link extending laterally outward in the working position from an inner end pivotally connected to the crank member and an outer end slidably connected to the wing section at a location spaced laterally outward from the crank member.

* * * * *